Jan. 17, 1939. F. E. WOLD 2,144,437
VIBRATOR MECHANISM
Original Filed Nov. 26, 1934  3 Sheets-Sheet 1
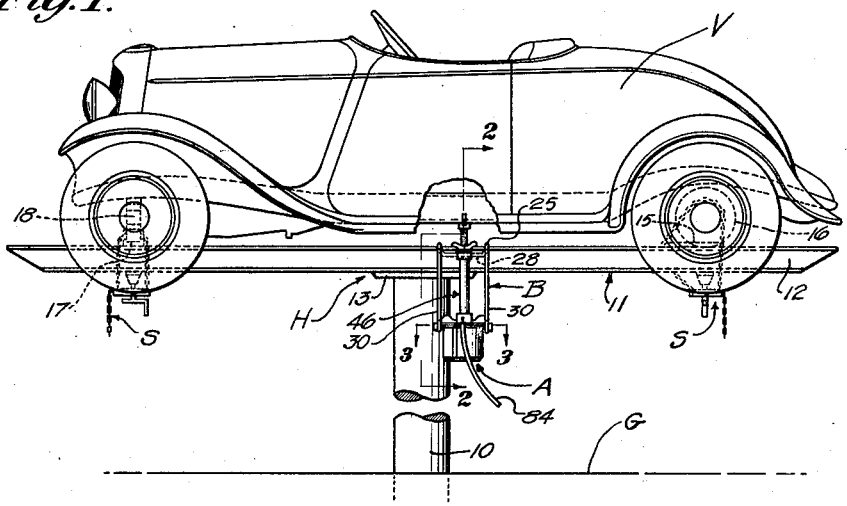
Inventor
Frank E. Wold.
Attorney.

Jan. 17, 1939.  F. E. WOLD  2,144,437
VIBRATOR MECHANISM
Original Filed Nov. 26, 1934  3 Sheets-Sheet 2
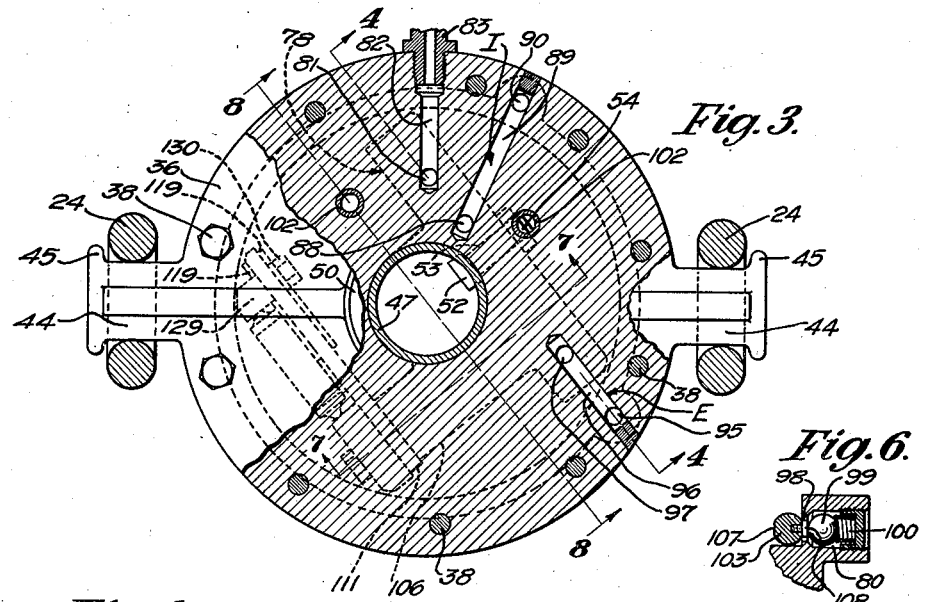
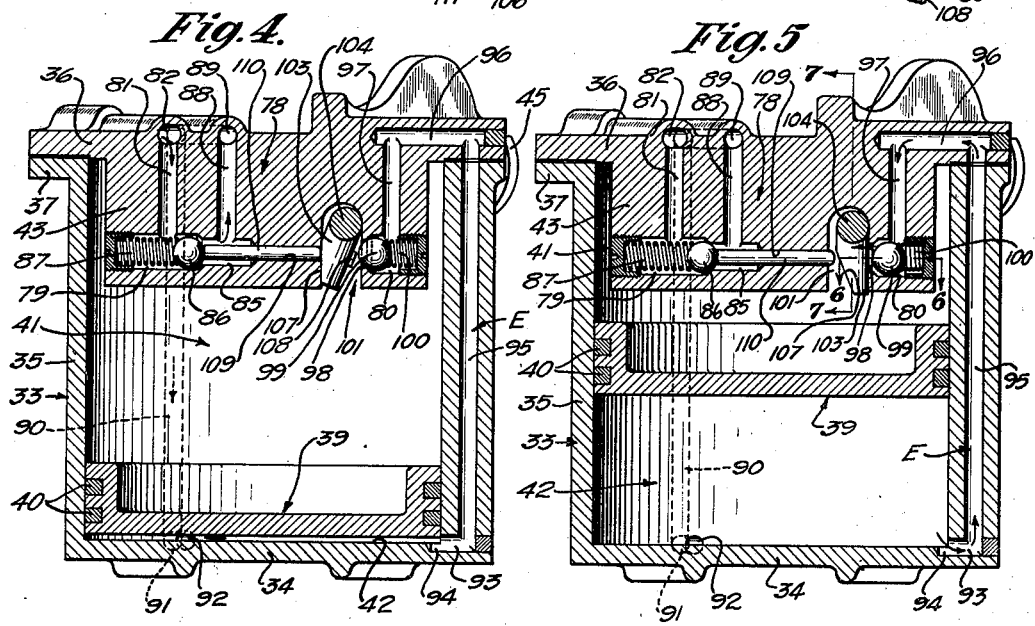
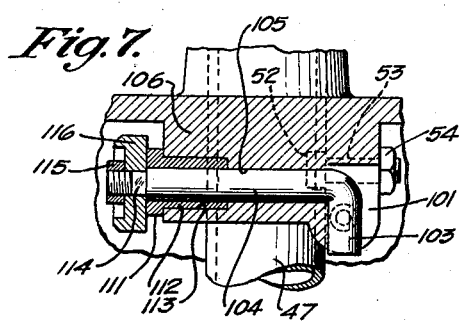
Inventor
Frank E. Wold.
Attorney.

Jan. 17, 1939. F. E. WOLD 2,144,437
VIBRATOR MECHANISM
Original Filed Nov. 26, 1934 3 Sheets-Sheet 3
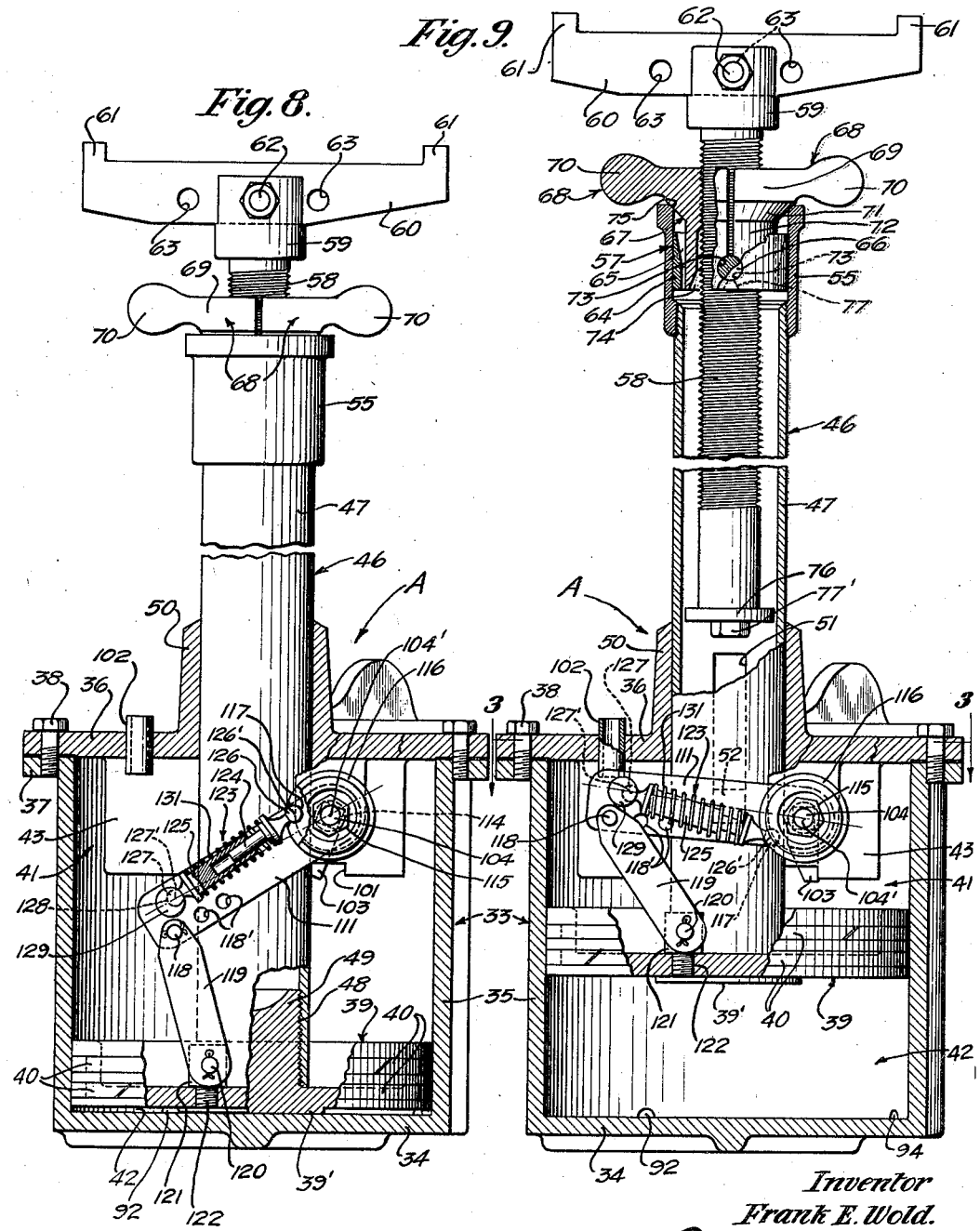
Inventor
Frank E. Wold.
Attorney.

Patented Jan. 17, 1939

2,144,437

UNITED STATES PATENT OFFICE 2,144,437

VIBRATOR MECHANISM

Frank E. Wold, Santa Monica, Calif.

Original application November 26, 1934, Serial No. 754,836, now Patent No. 2,062,549, dated December 1, 1936. Divided and this application October 26, 1936, Serial No. 107,619

10 Claims. (Cl. 121—164)

This invention relates to vibrator mechanisms, and while it is particularly well adapted for use in connection with servicing equipment for vehicles, wherein it supplies means for controllably rocking or vibrating a vehicle while it is being lubricated, it will be understood the invention, considered in its broader aspects, is not limited to such use.

This application is a division of application Ser. No. 754,836, filed November 26, 1934, on Servicing equipment for vehicles, now Patent 2,062,549 of December 1, 1936. Without intending to limit the invention thereto, the device will be described in the environment of said copending application, due to the particular adaptability of the device to that field.

It is well recognized that in lubricating leaf springs, shackle-bolts and other movable joints of a vehicle, there is a decided lack of penetration of the lubricant to the rubbing surfaces unless the joints be moved during the lubricating operation. This is particularly true if the joints be tight, even though a high pressure lubricating system be employed. For instance, a tight shackle-bolt connection may absolutely defy penetration unless joint-movement be set up through the use of a crowbar or the like.

It is therefore among the objects of my invention to provide an automatic, fluid-operated vibrator for use with servicing equipment whereby a vehicle may be continuously rocked or vibrated during the lubrication thereof, thus insuring efficient distribution of the lubricant between the rubbing surfaces of all movable joints. This is accomplished by elevating the vehicle on a hoist and applying the vibrator to any suitable portion of the vehicle, the vehicle axles preferably having first been strapped to the hoist.

The equipment may also be used to advantage in disclosing loose body bolts and the like and in locating frame or body squeaks, for as the vehicle is rocked by the vibrator these conditions are sufficiently aggravated to render them readily locatable by the operator.

The claims of this divisional application are directed to the vibrator mechanism, and while this mechanism, in said co-pending application and here is illustrated as adapted particularly for application directly to the hoist, it will be understood the claims in the present application are not limited to a mechanism so applied, for they contemplate a vibrator mechanism which can be utilized with equal advantage in connection with other types of mounting.

Further objects and features of the invention will be made apparent in the following detailed specification, reference being had to the accompanying drawings, in which:

Fig. 1 is a side elevation of servicing equipment, including my improved vibrator, in operative condition;

Fig. 2 is an enlarged, fragmentary section on line 2—2 of Fig. 1;

Fig. 3 is an enlarged plan section on line 3—3 of Fig. 1 and as taken on the plane of line 3—3 in Fig. 9, certain overlying parts being shown fragmentarily in full plan;

Fig. 4 is a section on line 4—4 of Fig. 3;

Fig. 5 is a view similar to Fig. 4 but showing the parts in changed position;

Fig. 6 is a fragmentary section on line 6—6 of Fig. 5;

Fig. 7 is a fragmentary section on line 7—7 of Fig. 5;

Fig. 8 is a longitudinally contracted side elevation of the vibrating mechanism, with the cylinder casing shown in sections as taken on line 8—8 of Fig. 3, and certain of the parts within that casing being shown in broken-away section in order to better illustrate their construction;

Fig. 9 is a view generally similar to Fig. 8 but showing the parts in changed position and also showing a portion of the telescopic piston rod in broken-away section.

In Figs. 1 and 2 I have illustrated a hydraulic or power hoist H which may be of any suitable construction but is here illustrated as including a usual plunger-piston 10 and a superstructure 11 consisting of side rails 12 of I-cross-section fastened centrally to plunger-plate 13 and thence diverging as indicated in Fig. 2. At one end a cross plate 14 is secured to the top of the side rails, the plate being centrally recessed at 15 to take differential casing 16 of vehicle V. The opposite ends of the side rails carry usual sliding blocks 17 upon which rest the front axle 18 of the vehicle. In order that reference later may be made to various parts of the vehicle, I will here designate such parts as follows: rear axle housing 19, chassis springs 20, shackles 21 and frame rails 22.

Either or both axles are preferably strapped down to the hoist, leaving all parts of the vehicle which are spring-supported from these axles or their immediately associated parts, free for movement under the influence of the vibrator, to be described. While the straps may be of any suitable type and may be applied at opposite ends of each axle or at only one or two of these points, as chosen by the operator, I have here illustrated a strap of the chain and clamp type, generally indicated at S, applied to each of the axles.

My improved automatic vibrating or reciprocating mechanism is generally indicated at A and preferably is removably suspended from the hoist by such means as a support or hanger generally indicated at B.

The hanger, which is adapted to be applied to the hoist after the latter has been raised to allow sufficient vertical clearance and to be detached before the hoist is lowered, consists of a continuous rod bent to provide a rail-engaging head 25 and two horizontally spaced and axially alined hooks or trunnion-bearings 24. The horizontal portions 25 of the head are adapted to rest on top one of the rails 12, these portions being bent downwardly and inwardly at 26 to provide hooks for engaging the underside of the inner flange 27 of rail 12, bends 26 being connected by bar-portion 28. Vertical legs or suspension members 29 are adapted to engage the outer flange edges but are preferably bent outwardly at 30 to offset the trunnion-bearings 24 with respect to rail 12 and thus provide increased horizontal clearance with respect to that rail. This clearance is preferably of a magnitude to allow inward swinging movement of those parts of the vibrating mechanism which extend upwardly past the rail and to bring the vertical axis of that mechanism into the most advantageous position with respect to the vehicle frame, as will hereinafter be made apparent, legs 29 preferably being of a length to bring trunnion-bearings 24 well below superstructure 11.

The hanger, with its vibrating mechanism, is adapted to be applied to and removed from the hoist when the latter is in an elevated position. Consequently, when the hoist is at the ground level G, the vibrating mechanism presents no interference to the normal operation of rolling a car onto or from the hoist.

However, after the hoist is raised and the hanger and mechanism A are applied thereto, considerable vertical clearance exists between the underside of the vehicle and the lower end of said mechanism (much greater than would be the case if the vibrating mechanism were mounted directly on the hoist-rail) and, accordingly, the vibrating mechanism may be of a size and character best adapted to apply proper vibratory motion to the vehicle. The relatively low position of trunnion-bearings 24 also increases the range of bodily movement of the vibrating unit so the vibrator thereof may be applied to parts of the vehicle which otherwise would be inaccessible.

The hanger may be applied to any desired part of the hoist-superstructure and hence beneath any desired part of the vehicle V, and, of course, once it is applied, it may later be easily slid along the hoist rails to various other selected positions.

Vibrating mechanism A includes a cylinder 33 of which the bottom head 34 is illustrated as being integral with annulus 35, whereas the upper head 36 is in the form of a detachable cap held to annulus flange 37 by cap screws 38. Piston head 39 (preferably, though not necessarily, provided with split-spring sealing rings 40 or the like) divides the cylinder bore into upper and lower chambers 41 and 42, respectively, cap 36 having an integral valve block 43 depending into upper chamber 41. Cap 36 also carries diametrically opposite trunnions 44 (Fig. 4) adapted to be taken in hanger-bearings 24, and flange 45 on the trunnions insuring against the hanger arms being sprung apart in a manner accidentally to free the cylinder from the hanger. Of course it lies within the scope of my invention to provide the trunnions or other hanger-attachment means on other parts of the cylinder 33, but the illustrated placement of the trunnions has been found well to serve the purpose.

The piston rod or vibrator generally indicated at 46 is, in effect, telescopically adjustable whereby its effective length may be varied. It includes a tubular portion 47 secured in any suitable manner to head 39 as by screwing it at 48 over the central head-stem 49. Tube 47 is guided in its vertical movement through cap 36 by sleeve-flange 50, and is longitudinally slotted at 51 to take the head 52 of bolt 53 which extends through valve-block 43 and is positioned by nut 54 (Figs. 3 and 7). The bolt, whose head 52 forms a key slidable through key-way 51, is inserted from the bore of tube 47 before head 39 is applied to said tube, and thereafter serves not only as a positive stop for limiting the upstroke of the piston (beyond the limit established by the valve-action to be described) but also prevents relative rotation between the tube portion of the piston rod and the cylinder so that the valve actuating mechanism, parts of which are secured to the piston and other parts of which are secured to the valve-block, may not be relatively rotated in the manner to displace said parts or put them under undue strain.

Secured to the upper end of tube 47 is a sleeve 55 whose bore 56 is adapted slidably to take the adjustment nut assembly 57 whereby the jack-screw portion 58 of piston rod 46 may be extended or retracted with respect to tube 47, thereby to vary the effective length of the rod, considered as a whole. The upper end of screw 58 carries a slotted head 59. Saddle 60, in the form of a bar having upstanding lugs 61 at its ends and a plurality of intermediate adjustment holes 63, is adapted to be held in the head-slot by bolt 62 which is extended through any selected hole 63.

Nut assembly 57 includes a ring 64 (Fig. 9) having a conical counter-bore 65 into which diametrically-opposite pins 66 project. Nut 67 is of the split type, the symmetrical halves 68 thereof each having a head portion 69 provided with a hand grip 70, a downwardly tapering wedge portion 71, and a semi-cylindrical neck portion 72, the latter being taken in ring bore 65. The opposed edges of neck portions 72 have semi-circular recesses 73 to take pins 66 whereby there is formed a loose pivotal connection between ring 64 and the nut-halves 68. The thread in each nut-half extends only through the head and wedge portions, the remainder of the bore and the conical counterbore 74 being smooth.

Normally, and also when the load is supported on saddle 60, nut-assembly 57 is in the condition of Fig. 9, the annular and downwardly tapering shoulder 75 of sleeve 65 engaging wedge faces 71 to force the nut-halves together and therefore operatively engaging the nut threads with jack-screw 68. Preferably, the angle of shoulder 75 is a little steeper than that of the side-faces of the threads. Washer 76 is secured by bolts 77' to the lower end of the jack-screw, this washer not only serving roughly to center the lower end of the jack-screw but also to prevent the nut assembly from dropping clear of the jack-screw when the latter is bodily removed from tube 47.

When it is desired to secure a rapid extension of the piston rod, such as in making an initial "coarse" adjustment, it is merely necessary to pull the jack-screw up, which action, through the thread-engagement, raises nut assembly 57 with respect to sleeve 55 and hence raises wedges 71 with respect to the shoulder 75, allowing the nut-halves to spread apart (as they have normal tendency to do by reason of the outwardly offset relation of their centers of mass with respect to their pivot points) clearing the nut threads from the jack-screw and thus allowing the screw to be lifted with respect to the nut. The opposed edges 77 of the nut-halves are cut back at points below pins 66, which provision, as well as the tapers of bores 65 and 74, allows ample swinging movement of the nut-halves to clear the threads. While the jack-screw is thus being lifted there is a repeated tendency for the nut-halves to drop as the individual nut and jack-screw threads pass each other, thus giving a ratcheting effect, but this does not delay the operation.

When the screw has been pulled up to the desired height under this "coarse" adjustment, it is released by the operator, and nut assembly 57 drops back to the position of Fig. 9, annular shoulder 75 re-engaging wedge faces 71 to force the nut-halves back into operative engagement with the jack-screw. Thereafter, by rotating nut 67 through handles 70, the screw may be further projecting to secure the desired "fine" adjustment.

Conversely, if it be desired quickly to collapse the piston rod, it is merely necessary to lift the jack-screw slightly until the nut-halves are spread and then manually hold the nut in that position while the screw is lowered freely or allowed to drop through the nut.

I will now describe the valves and their actuation whereby air under pressure and connected to the cylinder is controlled in a manner to set up reciprocation or vibratory movement of the piston rod or vibrator.

Valve block 43 is substantially L-shaped as viewed in plan (Fig. 3) and in the longer leg 78 thereof there are provided the horizontally extending and axially alined valve chambers 79 and 80 (Fig. 4). Opening to chamber 79 is a vertical passageway 81 which communicates at its upper end with horizontal passage 82, the latter opening to the peripheral edge of cap 36 and being adapted to take fitting 83, preferably in the form of a valve or stop-cock, the hose 84 (Fig. 2) applied to this valve leading from any usual source of air under pressure.

Opening into valve chamber 79 is passage 85, valve ball 86 being adapted, at times, to be urged by spring 87 into the seated position of Fig. 5, where it closes off communication between chamber 79 and 85. Extending upwardly from chamber 85 is passage 88 which is connected by horizontal passage 89 in cap 36 to vertical passage 90 extending downwardly through annulus 35 to horizontal passage 91 which opens at port 92 to cylinder chamber 42 beneath piston head 39. Preferably, head 39 has a central boss 39' which engages end-wall 34 positively to limit the downstroke of the piston (beyond the limit established by the valve mechanism to be described) and thus insure immediate admission of air to chamber 42 after a period of non-use. The passage system thus far described may be considered generally as an air inlet channel I, controlled by valve 86.

Exhaust channel E includes a horizontal passage 93 opening at port 94 from chamber 42 and communicating with vertical passage 95 which extends through annulus 35 and opens into horizontal passage 96 in cap 36. Passage 96 opens to vertical passage 97 in valve block 43, and is thereby put into communication with valve chamber 80, the outlet orifice 98 of this chamber being adapted to be closed, at times (Fig. 4) by valve ball 99 under the pressure of spring 100. Orifice 98 opens to slot 101 which is cut in block 42 and is, in turn, open to cylinder chamber 41, the latter being constantly open to the atmosphere through the bores of nipples 102 in cap 36 (Figs. 3 and 8).

Valve tappet 103 is arranged in slot 101 and is in the form of angular extension on rock shaft 104, the latter being mounted for oscillation in bore 105 of the shorter valve-block leg 106 (Fig. 7). Tappet 103 is substantially semi-circular in cross section, the flat face 107 thereof being angled off as clearly shown in Figs. 4 and 5, while the arcuate face preferably carries a hardened tip 108 adapted, at times, to engage ball 99 and thrust it from its seat against the action of spring 100. The oscillatory stroke of tappet 103 is limited by the engagement of its opposite faces with the opposed defining walls of slot 101.

Extending axially through passage 85 and bore 109 in block 43 and thence into slot 101 in the path of tappet 103, is tappet rod 110. Mounted for oscillation on rock shaft 104 is a link or lever 111 (Figs. 7 and 8) which preferably has a sleeve 112 having internal bearing on the shaft and external bearing in block-counterbore 113. Non-rotatively fixed on the end of shaft 104, as by square 114 and nut 115, is a head 116, in the peripheral face of which is socket 117. Pivotally connected at 118 to the outer end of link 111 is a pair of links 119 (Figs. 3 and 8), the lower ends of the latter being pivotally connected at 120 to post 121 which is threaded at 122 into piston head 39.

A snap-actuator generally indicated at 123 is applied to link 111 and head 116 whereby rock shaft 104 and tappet 103 are snapped from the position of Fig. 8 to that of Fig. 9, and vice versa, upon piston 39 reaching predetermined positions within the cylinder 33. This actuator comprises telescopically arranged pin and sleeve 124, 125, respectively, the one having a spherical head 126 seated in socket 117 and the other having a spherical head 127 seated in socket 128 provided in post 129, said post being fastened to link or lever 111 by nut 130 (Fig. 3).

In discussing the action of the actuator and control means therefor, I will refer to a certain "line of centers" and for this purpose I will designate the axis of shaft 104 as center 104' and the centers of heads 126 and 127 as 126' and 127', respectively.

Compression spring 131 constantly tends to extend the pin and sleeve relatively, and thus, when the piston head is at its lower limit of travel, the parts occupy the positions shown in Fig. 8 and, since center 126' is above the line of centers 104'—127', the spring exerts through pin 124 such pressure on head 116 as to tend to rotate it in a clockwise direction, thus holding tappet 103 in the position of Fig. 4, where it acts through tappet rod 110 to hold ball 86 off its seat against the pressure of spring 87.

Now assume that the servicing equipment is to be put to use. After the vehicle has been lifted by the hoist and its axles have been strapped thereto, hanger B is applied to one of the rails 12 and vibrating mechanism A is mounted on the hanger as illustrated in Figs. 1 and 2. Piston rod 46 is then extended (by the coarse and fine adjustments spoken of before) until saddle 60 is firmly applied to a chosen part of the vehicle, for instance, to one of the frame rails 22. This application may be such as shown either in full or dotted lines in Fig. 2, it being noted that the pivotal mounting of the vibrating mechanism on the hanger allows said mechanism to be swung from vertical so the vibrator or piston rod may reach and be applied to points of the vehicle which may be out of vertical alinement with the trunnion-bearings of the hanger.

When valve 83 is opened, air under pressure flows through the following course;—passageways 82, 81, 79, 85, 88, 89, 90, 91 and thence through port 92 into cylinder chamber 41 beneath piston head 39, thus raising the latter and projecting piston rod or vibrator 46 in a manner to lift that part of the vehicle to which it is applied. Of course, during this part of the cycle, spring 100 holds exhaust valve 99 closed to prevent the escape of high-pressure air, the air in chamber 41 above the piston being exhausted through the bores of nipples 102.

As the piston head travels upwardly, the control-linkage 111, 119 folds together or angularly closes, and centers 127', 126' and 104' are gradually brought into line, causing telescopic contraction of the pin and sleeve assembly 124, 125 and longitudinal compression of spring 131. As the line of centers 127'—104' passes above center 126' (which is calculated to occur at the predetermined stroke-limit of the piston head) spring 131 becomes effective to project pin 124 in a manner to snap head 116 and hence shaft 104 in a counter-clockwise direction to the position of Fig. 9. This movement snaps tappet 103 to the position of Figs. 5 and 6, allowing valve 86 to close and thus cut off further inlet flow of air to chamber 42, while tip 108 opens valve 99 against the pressure of spring 100. The weight of the car is then free to depress the piston, the air beneath head 39 being exhausted through the following channel; passageways 93, 95, 96, 97, 80, orifice 98, slot 101 and chamber 41, whence it passes to the atmosphere through the bores of nipples 102.

The downward movement of head 39 gradually spreads linkage 111, 119, and as the line of centers 127'—104' passes below center 126', spring 131 becomes effective to snap head 116, shaft 104 and tappet 103 back to the positions of Fig. 8, thus closing exhaust channel E and reopening the inlet valve 86 to cause a reoccurrence of the described cycle of operation.

Reciprocation of vibrator 46 thus continues as long as valve 83 is open, and the rocking or vibratory effect given to the vehicle opens and closes leaf springs 20, works the shackle-bolt connections, and sets up such general movement of the vehicle parts as to enable the full penetration of lubricant applied to the various joints by the operator while the vehicle is subjected to the vibratory movement. The pivotal mounting of the vibrating mechanism on hanger B allows the vibrating mechanism to swing and thus accommodate itself to such pivotal movement as the vehicle frame may have during the travel of the piston. For instance, since the vibrator is usually applied to the vehicle frame at one side of its vertical axial plane, the frame will be given a tilting or pivotal movement about an axis at the far side of said vertical axial plane.

The stroke of the vibrator, as determined by the valve timing, may be varied by altering the effective length of link or lever 111 through attachment of links 119 thereto at different selected pin holes 118'.

Nipples 102 serve not only to maintain chamber 41 in communication with the atmosphere but also serve as inlets through which lubricants may be introduced to chamber 41. Since the entire valve mechanism is within this chamber, it is kept efficiently lubricated by this single body of oil, both by splash action and by the oil spray set up through the intermittent jetting of air from orifice 98. Should any of the oil leak down into chamber 42 during periods of non-use, it is promptly forced back into the upper chamber through exhaust channel E as soon as the vibrator is operated.

While I have shown and described a preferred embodiment of my invention, it will be understood the drawings and description are to be considered as illustrative of and not limitative on the claims appended hereto, for various changes in design, structure and arrangement may be made without departing from the spirit and scope of those claims.

I claim:

1. In an automatic vibrating mechanism, a vertically arranged cylinder, a piston within the cylinder and dividing the cylinder bore into upper and lower chambers, a piston rod extending through the upper chamber, there being inlet and outlet passages provided in the cylinder, both passages being in constant communication with the lower cylinder chamber, valve mechanism for said passages and located in the upper chamber, and means operative by virtue of piston reciprocation to control the operation of said valve mechanism.

2. In an automatic vibrating mechanism, a vertically arranged cylinder, a piston within the cylinder and dividing the cylinder bore into upper and lower chambers, a piston rod extending through the upper chamber, there being inlet and outlet passages provided in the cylinder, both passages being in constant communication with the lower cylinder chamber, valve mechanism for said passages and located in the upper chamber, and means operative by virtue of piston reciprocation to control the operation of said valve mechanism, said means embodying a rock shaft, a tappet on said shaft and operable by oscillation thereof to actuate the valve mechanism, a snap-actuator for oscillating said shaft, and a link pivotally connected to both the actuator and piston whereby piston reciprocation controls the operation of said actuator.

3. In an automatic vibrating mechanism, a cylinder, a piston within the cylinder, there being separate inlet and outlet passages provided in the cylinder and in constant communication with the cylinder bore at one side of the piston, and means operative by virtue of piston reciprocation to control fluid flow therethrough, said means embodying a pair of valves, one for each of the passageways, a rock shaft, means on said rock shaft operable upon oscillation thereof to open one valve and allow the other to close, a snap-actuator for oscillating the shaft, and means operatively connecting the snap-actuator and piston to control the actuation of said actuator.

4. In an automatic vibrating mechanism, a cylinder, a piston within the cylinder, there being separate inlet and outlet passages provided in the cylinder and in constant communication with the cylinder bore at one side of the piston, and means operative by virtue of piston reciprocation to control fluid flow therethrough, said means embodying a pair of valves, one for each of the passageways, said valves being disposed opposite one another, a rock shaft, means on said rock shaft and between the valves, operable upon oscillation thereof to open one valve and allow the other to close, a snap-actuator for oscillating the shaft, and means operatively connecting the snap-actuator and piston to control the actuation of said actuator.

5. In an automatic vibrating mechanism, a vertically arranged cylinder, a piston within the cylinder and dividing the cylinder bore into upper and lower chambers, a piston rod extending through the upper chamber, the upper chamber being vented to the atmosphere, there being separate inlet and outlet passages provided in the cylinder with both said passages in communication with the lower chamber and the outlet passage opening to the upper chamber, valve mechanism for said passages and located in the upper chamber, and means operative by virtue of piston reciprocation to control the operation of said valve mechanism.

6. In a device of the character described, a cylinder, a piston within the cylinder, there being a passageway in the cylinder for passage of motivating fluid to or from the cylinder bore at one side of the piston, a valve for said passageway, a rock shaft operable upon rotation thereof to control valve movement, and means for rocking said shaft, said last named embodying a lever pivoted on said shaft, a head on said shaft, a telescopic rod extending from said head and having pivotal engagement at its opposite ends with said head and said lever, a spring tending to extend said rod and thereby exerting a force tending to rotate the head and shaft in one direction or the other depending upon the angular position of the lever, and means for swinging the lever to vary its angular position and embodying a link connecting the lever and piston throughout the piston reciprocation.

7. In an automatic vibrating mechanism, a vertically arranged cylinder, a piston within the cylinder and dividing the cylinder bore into upper and lower chambers; a piston rod extending through the upper chamber, there being inlet and outlet passages provided in the cylinder, the upper chamber being constantly vented to the atmosphere and both said passages being in communication with the lower chamber, said outlet passage being openable to the upper cha..1ber; valve mechanism for said passages and located in the upper chamber, and means operative by virtue of piston reciprocation to control the operation of said valve mechanism, said means being connected to the piston throughout periods of piston reciprocation.

8. In an automatic reciprocating mechanism, a cylinder, a piston within the cylinder, there being a passageway for passage of motivating fluid to or from the cylinder bore at one side of the piston, a valve for said passageway, a rocking member operable by virtue of its rocking movement to control valve movement, and means for rocking said member, said last named means embodying a lever mounted for pivotal movement with respect to said member about the rock-axis of said member as a center, a telescopic rod extending from the distal end of the lever to said rocking member at a point radially spaced from the rock axis, a spring tending to extend said rod and thereby exerting a force tending to rotate the member in one direction or the other depending upon the angular position of the lever, and piston-actuated means applied to the lever to vary the angularity of the lever by virtue of piston reciprocation.

9. In an automatic reciprocating mechanism, a cylinder, a piston within the cylinder, there being a passageway for passage of motivating fluid to or from thm the cylinder bore at one side of the piston, a valve for said passageway, a rocking member operable by virtue of its rocking movement to control valve movement, and means for rocking said member, said last named means embodying a lever mounted for pivotal movement with respect to said member about the rock-axis of said member as a center, a telescopic rod extending from the distal end of the lever to said rocking member at a point radially spaced from the rock axis, a spring tending to extend said rod and thereby exerting a force tending to rotate the member in one direction or the other depending upon the angular position of the lever, and means for swinging the lever to vary its angular position and embodying a link connecting the lever and piston.

10. In an automatic vibrating mechanism, a vertically arranged cylinder, a piston within the cylinder and dividing the cylinder bore into upper and lower chambers, a piston rod extending through the upper chamber, there being inlet and outlet passages provided in the cylinder, both passages being in constant communication with the lower cylinder chamber, valve mechanism for said passages and located in the upper chamber, and means operative by virtue of piston reciprocation to control the operation of said valve mechanism; said last mentioned means embodying a rocking member operable by virtue of its rocking movement to actuate the valve, and means for rocking said member, said last named means embodying a lever mounted for pivotal movement with respect to said member about the rock-axis of said member as a center, a telescopic rod extending from the distal end of the lever to said rocking member at a point radially spaced from the rock axis, a spring tending to extend said rod and thereby exerting a force tending to rotate the member in one direction or the other depending upon the angular position of the lever, and piston-actuated means applied to the lever to vary the angularity of the lever by virtue of piston reciprocation.

FRANK E. WOLD.